US011995460B2

(12) United States Patent
Wu et al.

(10) Patent No.: US 11,995,460 B2
(45) Date of Patent: May 28, 2024

(54) RESOURCE DETERMINATION DEVICE, METHOD, AND PROGRAM

(71) Applicant: Nippon Telegraph and Telephone Corporation, Tokyo (JP)

(72) Inventors: Chao Wu, Tokyo (JP); Shingo Horiuchi, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 487 days.

(21) Appl. No.: 17/289,398

(22) PCT Filed: Oct. 29, 2019

(86) PCT No.: PCT/JP2019/042411
§ 371 (c)(1),
(2) Date: Apr. 28, 2021

(87) PCT Pub. No.: WO2020/090830
PCT Pub. Date: May 7, 2020

(65) Prior Publication Data
US 2022/0004419 A1 Jan. 6, 2022

(30) Foreign Application Priority Data
Oct. 30, 2018 (JP) .................................. 2018-203673

(51) Int. Cl.
*G06F 9/44* (2018.01)
*G06F 9/455* (2018.01)
(52) U.S. Cl.
CPC .. *G06F 9/45558* (2013.01); *G06F 2009/4557* (2013.01)

(58) Field of Classification Search
CPC .................................................. G06F 9/45558
USPC ......................................................... 718/104
See application file for complete search history.

(56) References Cited

U.S. PATENT DOCUMENTS

2016/0021024 A1* 1/2016 Parikh ................. G06F 9/45558
709/226
2016/0041844 A1* 2/2016 Heilper ................... G06F 11/34
703/22

(Continued)

OTHER PUBLICATIONS

Iosup et al., "On the Performance Variability of Production Cloud Services," 2011 11th IEEE/ACM International Symposium on Cluster, Cloud and Grid Computing, 2011, pp. 104-113.

(Continued)

*Primary Examiner* — Timothy A Mudrick
(74) *Attorney, Agent, or Firm* — Fish & Richardson P.C.

(57) ABSTRACT

A resource determination device according to a storage unit configured to store a model indicating a relationship of: a processing load of a virtual machine; a processing performance of the virtual machine; a resource operational status of a physical machine accommodating the virtual machine; and a resource operational status of the virtual machine, with respect to an amount of resources allocated to the virtual machine, and a calculation unit configured to calculate the amount of resources allocated to the virtual machine in a way such that a requirement for the processing performance of the virtual machine and a policy of the resource operational status of the virtual machine are each satisfied based on a monitoring result of the resource operational status of the physical machine accommodating the virtual machine, the processing load of the virtual machine, and the model stored in the storage unit.

10 Claims, 13 Drawing Sheets

(56) References Cited

OTHER PUBLICATIONS

Kousiouris et al., "Translation of Application-level Terms to Resource level attributes across the Cloud Stack Layers," IEEE Symposium on Computers and Communications, 2011, pp. 153-160.

* cited by examiner

| timestamp | sent requests per second | received responses per second | average process time | ALLOCATED TO VM | | | CPU USAGE RATE IN VM | MEMORY USAGE RATE IN VM | HOST CPU USAGE RATE | HOST MEMORY USAGE RATE | OTHERS, i/o THROUGHPUT, STORAGE USAGE RATE, PAGING RATIO |
| --- | --- | --- | --- | --- | --- | --- | --- | --- | --- | --- | --- |
| | | | | vCPU COUNT | AMOUNT OF MEMORY | storage size | | | | | |
| 2018-7-31-18-01 | 3000 | 3000 | 10 ms | 1 | 1G | 10G | 40% | 33% | 22% | 13% | ... |
| ... | ... | ... | ... | ... | ... | ... | ... | ... | ... | ... | ... |
| 2018-7-31-18-20 | 10000 | 8700 | 11 ms | 4 | 1G | 10G | 30% | 66% | 37% | 29% | ... |
| ... | ... | ... | ... | ... | ... | ... | ... | ... | ... | ... | ... |
| 2018-7-31-19-15 | 30000 | 25899 | 23 ms | 8 | 3G | 20G | 50% | 23% | 57% | 41% | ... |
| WORKLOAD | | PERFORMANCE | | AMOUNT OF RESOURCE ALLOCATED TO VM | | | OPERATIONAL STATUS | | ENVIRONMENTAL CONDITIONS | | |

Fig. 5

RESOURCE DETERMINATION DEVICE, METHOD, AND PROGRAM

CROSS-REFERENCE TO RELATED APPLICATIONS

This application is a National Stage application under 35 U.S.C. § 371 of International Application No. PCT/JP2019/042411, having an International Filing Date of Oct. 29, 2019, which claims priority to Japanese Application Serial No. 2018-203673, filed on Oct. 30, 2018. The disclosure of the prior application is considered part of the disclosure of this application, and is incorporated in its entirety into this application.

TECHNICAL FIELD

Embodiments of the present disclosure relates to a resource determination device, method, and program.

BACKGROUND ART

Various corporate users (hereinafter, users) are expected to utilize more cloud services (hereinafter may also be referred to as services) provided by cloud providers to provide services within their own organizations or to end users.

In this context, cloud providers are required to provide services requested by users quickly and accurately at a low cost. Cloud providers use a virtualization technology to provide services to their users.

With this virtualization technology, a virtual machine (VM) is generated on a general-purpose server. The VM may be provided with various functions, examples of which include a Firewall (FW) function, a Web Server (WS) function, Deep Packet Inspection (DPI), a Database (DB) function, and the like.

Furthermore, the virtualization technology allows the processing performance of functions to be freely changed by making changes in an amount of resources allocated to VMs, including, for instance, a number of virtual Central Processing Units (vCPUs) and a memory amount. Cloud providers combine the above functions to provide services to users (see Non Patent Literatures 1 and 2).

CITATION LIST

Non Patent Literature

Non Patent Literature 1: A. Iosup, N. Yigitbasi, and D. Epema, "On the Performance Variability of Production Cloud Services," IEEE/ACM International Symposium on Cluster, Cloud and Grid Computing, 2011

Non Patent Literature 2: G. Kousiouris et al., "Translation of application level terms to resource level attributes across the Cloud stack layers," IEEE Symposium on Computers and Communications, pp. 153 to 160, 2011

SUMMARY OF THE INVENTION

Technical Problem

Currently, cloud services are generally provided in a unit of resource amount, examples of which include vCPU counts and memory amounts. Unfortunately, with a solution described in Non Patent Literature 1, the performance of a service cannot be guaranteed under conditions in which a resource amount is guaranteed. Currently, for issues regarding guaranteeing the service performance, the following problems (1) and (2) exist:

(1) A problem related to determination of the amount of resources required and allocated to VMs in consideration of workload, environmental condition, and an operational policy to satisfy the performance requirement of a service required by the users when the service starts to be provided (2) A problem related to determination of the adjustment of the amount of resources to be allocated to VMs in accordance with a change in at least one of the following: workload, environmental conditions, or an operational policy so as to keep satisfying the performance requirements of the service required by the users when the service is under operation The determination related to the problems (1) and (2) described above depends on the skill level of the cloud providers or the corporate users, as high skill level is needed, thereby requiring high costs for securing such personnel.

In view of this, Non Patent Literature 2 proposes a method of determining an amount of resources to guarantee the satisfaction of performance requirements. However, this method does not consider the environmental conditions and the operational policy as factors affecting the determination of the amount of resources required during the actual operation.

The performance requirements are roughly classified into workload processing performance requirement and delay requirement.

The workload processing performance requirement correspond to requests from users regarding service processing performances.

Examples of the workload processing performance requirement for a cloud-based web service, firewall, DPI service, and the like include: (1) processing 95[%] of the requests or more; and (2) being capable of accommodating 90[%] of the users or more.

The delay requirement corresponds to requests from users regarding the service processing time.

Examples of the delay requirements for a cloud-based web service, firewall, DPI service, and the like include suppressing 90[%] of the request processing time to 100 [ms] or shorter.

Furthermore, examples of the workload processing performance requirement for a cloud-based machine learning training service and the like include processing training data of a single batch within 130 [ms].

In this example, the workload described above is a general term for the type of workload, the feature of the workload, and the amount of the workload that the user is attempting to accommodate and process using the cloud.

For example, the type of workload is defined as a web service, the feature of the workload is defined as the size of a web page 20 [kB] and the like, and the amount of the workload is defined as 10000 requests per second (described below as 10000 [requests per second]).

In another example, the type of workload is defined as machine learning training, the feature of the workload is defined as a learning algorithm configuration, and the amount of the workload is defined as the size of training data of a single batch (for example, 30 images each composed of 32*32 [pixels] and 256 colors).

The environmental condition described above corresponds to a state of a physical server (host) accommodating VMs for providing a service.

Examples of dynamic environmental conditions include a resource usage rate of a physical server, which is also referred to herein as host congestion level. Examples of static environmental conditions include the type of CPU of the physical server, the architecture of the memory, and the like.

The operational policy described above is a policy defined by a user or a cloud provider, and is a policy to be followed when the cloud service is under operation. With the operational policy defined, the desirable operational status of the cloud service can be maintained at a desirable status. For example, with an operational policy of a limitation on a resource usage rate in a VM defined, effects such as improvement of the VM resource usage rate and reduction in the possibility of occurrence of bottleneck can be expected.

The present disclosure is made in view of the above, and an advantage of some aspects of the disclosure is to provide a resource determination device, method, and program enabling an amount of resource required for a virtual machine to be appropriately obtained.

Means for Solving the Problem

To achieve the above object, a first aspect of a resource determination device according to one embodiment of the present disclosure is a resource determination device including a storage unit configured to store a model indicating a relationship of: a processing load of a virtual machine; processing performance of the virtual machine; a resource operational status of a physical machine accommodating the virtual machine; and a resource operational status of the virtual machine, with respect to an amount of resources allocated to the virtual machine, and a calculation unit configured to calculate the amount of resources allocated to the virtual machine in a way such that a requirement for the processing performance of the virtual machine and a policy of the resource operational status of the virtual machine are each satisfied based on a monitoring result of the resource operational status of the physical machine accommodating the virtual machine, the processing load of the virtual machine, and the model stored in the storage unit.

According to a second aspect of the resource determination device of the present disclosure, as in the first aspect, the calculation unit is configured to recalculate the amount of resources allocated to the virtual machine in a way such that the requirement for the processing performance of the virtual machine and the policy of the resource operational status of the virtual machine are each satisfied when at least one of the following changes: the processing load of the virtual machine; the requirement for the processing performance of the virtual machine; the policy of the resource operational status of the virtual machine; or the result of monitoring the resource operational status of the physical machine accommodating the virtual machine.

A third aspect of the resource determination device of the present disclosure further includes, as in the first aspect, an implementation unit configured to implement a resource in the virtual machine based on a calculation result by the calculation unit, and a monitoring unit configured to monitor each of: a resource operational status of the physical machine accommodating the virtual machine in which the resource is implemented by the implementation unit; a resource operational status of the virtual machine in which the resource is implemented by the implementation unit; a processing load of the virtual machine in which the resource is implemented by the implementation unit; and a processing performance of the virtual machine in which the resource is implemented by the implementation unit, and output as the monitoring result, wherein the model is learned based on the monitoring result by the monitoring unit, and the calculation unit is configured to calculate the amount of resources allocated to the virtual machine in a way such that the requirement for the processing performance of the virtual machine and the policy of the resource operational status of the virtual machine are each satisfied based on the processing load of the virtual machine in which the resource is implemented by the implementation unit, the result of monitoring the resource operational status of the physical machine accommodating the virtual machine in which the resource is implemented by the implementation unit, and the model stored in the storage unit.

One aspect of a method of resource determination performed by the resource determination device according to one embodiment of the present disclosure includes acquiring a model indicating a relationship of: a processing load of a virtual machine; processing performance of the virtual machine; a resource operational status of a physical machine accommodating the virtual machine; and a resource operational status of the virtual machine from a storage unit, with respect to an amount of resources allocated to the virtual machine, and calculating the amount of resources allocated to the virtual machine in a way such that a requirement for the processing performance of the virtual machine and a policy of the resource operational status of the virtual machine are each satisfied based on the acquired model, a monitoring result of the resource operational status of the physical machine accommodating the virtual machine, and the processing load of the virtual machine.

One aspect of a resource determination processing program according to one embodiment of the present disclosure causes a processor to operate as each unit of the resource determination device described in any one of the first to third aspects.

Effects of the Invention

According to the first aspect of the resource determination device according to one embodiment of the present disclosure, the amount of resource allocated to the virtual machine is calculated in a way such that the requirement for the processing performance of the virtual machine and the policy of the resource operational status of the virtual machine are each satisfied based on the monitoring result of the operational status of the resource of the physical machine accommodating the virtual machine and the processing load of the virtual machine. Thus, the amount of resources required by the virtual machine can be appropriately determined, and the costs of human resources for determining the resources can be reduced.

According to the second aspect of the resource determination device according to one embodiment of the present disclosure, the amount of resources allocated to the virtual machine is recalculated in a way such that the requirement for the processing performance of the virtual machine and the policy of the resource operational status of the virtual machine are each satisfied when at least one of the following changes: the processing load of the virtual machine; the requirement for the processing performance of the virtual machine; the policy of the resource operational status of the virtual machine; or the result of monitoring the resource operational status of the physical machine accommodating the virtual machine. Thus, the amount of resources can be appropriately adjusted.

According to the third aspect of the resource determination device according to one embodiment of the present disclosure, the resource operational status of the physical machine accommodating the virtual machine in which the resource is implemented, the resource operational status of the virtual machine in which the resource is implemented, the processing load of the virtual machine in which the resource is implemented, and the processing performance of the virtual machine in which the resource is implemented are monitored and the result is output, and the model is relearned as needed based on these monitoring results.

Thus, the accuracy of model-based calculation of the resource amount can be more increased with more monitoring data accumulated.

In addition, because the amount of resources allocated to the virtual machine is calculated in accordance with the result of monitoring, even if not set by the user, the amount of resources can be autonomously determined appropriately, and the processing performance of the virtual computing device can be maintained.

Thus, the present disclosure enables the amount of resources required for a virtual machine to be appropriately obtained.

BRIEF DESCRIPTION OF DRAWINGS

FIG. 5 is a diagram illustrating as a table an example of monitoring data output by the resource determination device according to one embodiment of the present disclosure.

DESCRIPTION OF EMBODIMENTS

Embodiments according to the present disclosure will be described below with reference to the drawings.

A resource determination device according to the present embodiment automatically determines, without depending on a skilled person, the amount of resources required to be allocated to virtual machines (VMs) based on workload, environmental conditions, and an operational policy for satisfying performance requirements of a service required by users when the service starts to be provided.

The workload corresponds to the processing load of virtual machines. The performance requirements correspond to processing performance requirements of virtual machines. The environmental conditions correspond to the operational status of the resource of a physical machine accommodating virtual machines. The operational policy corresponds to the policy of the operational status of the resource of virtual machines.

The resource determination device according to the present embodiment automatically adjusts the amount of resources allocated to VMs when at least one of the performance requirements, the workload, the environmental conditions, or the operational policy changes, such that the performance requirements of the service required by the users can be kept satisfied when the service is under operation.

This is expected to achieve effects such as guaranteeing satisfaction of performance requirements of a cloud service, enabling cloud service subscription in a unit of performance, and reducing the personnel cost for providing the cloud service.

Figure 1:
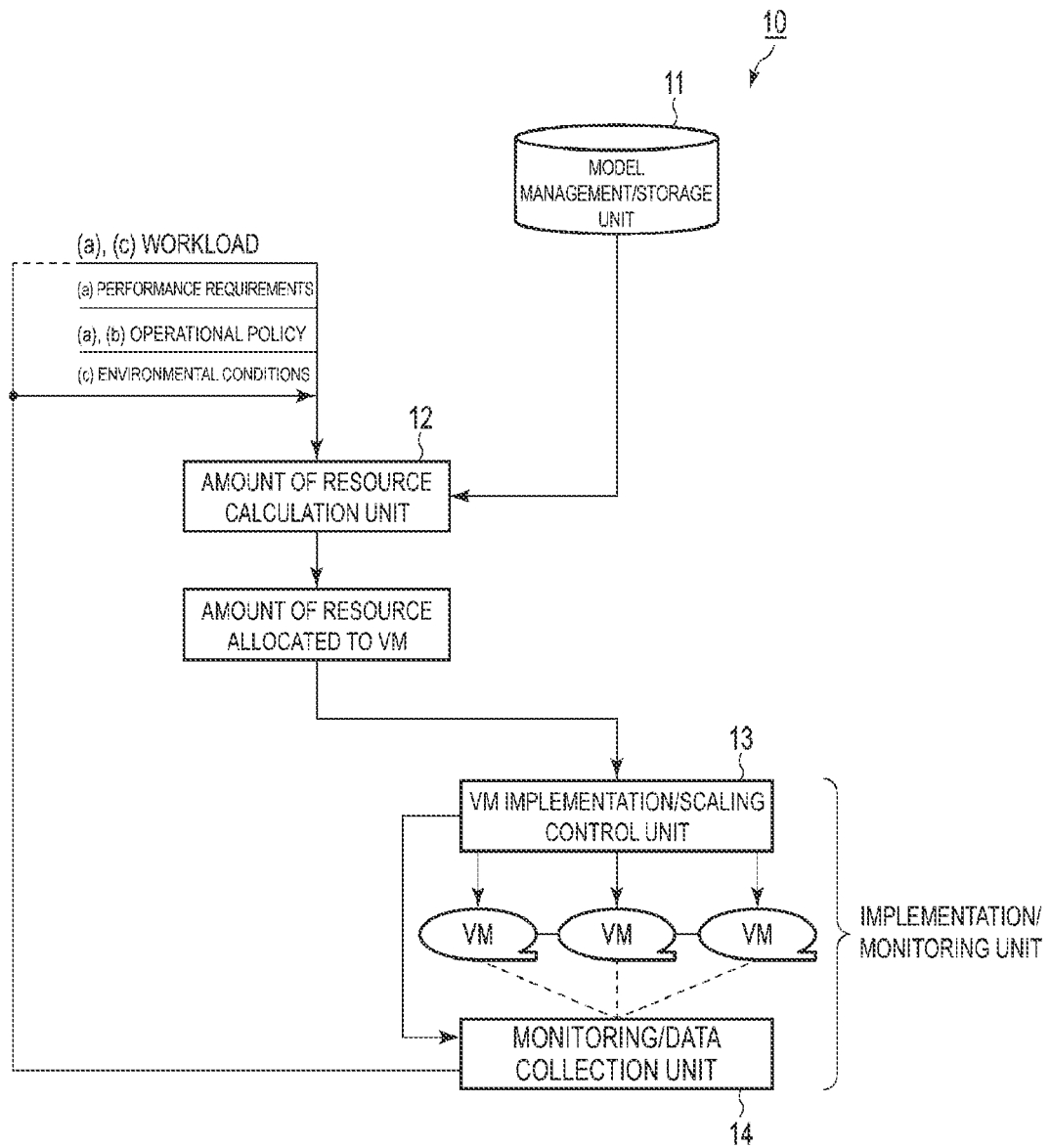
FIG. 1 is a diagram illustrating an application example of a resource determination device according to one embodiment of the present disclosure.

FIG. 1 is a diagram illustrating an application example of a resource determination device according to one embodiment of the present disclosure.

As illustrated in FIG. 1, a resource determination device 10 according to one embodiment of the present disclosure includes a model management/storage unit 11, a resource amount calculation unit 12, a VM implementation/scaling control unit 13, and a monitoring/data collection unit 14. The VM implementation/scaling control unit 13 and the monitoring/data collection unit 14 can also be collectively referred to as an implementation/monitoring unit.

Furthermore, the resource determination device 10 can be implemented with a system using a computer device such as a personal computer (PC). For example, the computer device includes a processor such as a CPU, a memory connected to the processor, and an input/output interface. Among these, the memory is configured with a storage device including a storage medium such as a non-volatile memory.

The functions of the resource amount calculation unit 12, the VM implementation/scaling control unit 13, and the monitoring/data collection unit 14 in the resource determination device 10 are implemented, for example, with the processor reading and executing computer programs stored in the memory, for example. Some or all of these functions may be implemented by a circuit such as an application specific integrated circuit (ASIC).

The model management/storage unit 11 is provided in a non-volatile memory, among the above-described memories, to and from which writing and reading can be performed any time.

The model management/storage unit 11 stores a fitting/learning model (the fitting model or the learning model described below) indicating a relationship (interaction level) of: the performance of a VM; the workload of the VM; the resource operational status of the VM; and environmental conditions, with respect to the resource amount. The fitting/learning model is generated by performing fitting/learning on an initial model by an existing learner (not illustrated) using past monitoring data that is monitoring data in the past. The past monitoring data includes (1) log data related to the workload, (2) log data related to performance, (3) log data related to the operational status of the VM resource, (4) log data related to the environmental conditions, (5) log data related to the resource amount, and the like, that are accumulated while a cloud service is being provided.

The resource amount calculation unit 12 calculates the amount of resources required to be allocated to the VMs by inputting input data (log data related to the workload, performance requirements, operational policy, and environmental conditions) to the fitting/learning model. The resource amount calculation unit 12 can implement real time extraction of the log data related to the environmental conditions from the monitoring data, which is an output from the monitoring/data collection unit 14. The log data related to the workload can be extracted from a cloud user's setting data or from the monitoring data described above. The performance requirements may be set by the cloud user. The operational policy may be set by the cloud user or the cloud provider.

In FIG. 1, (a) is a parameter that can be set by the cloud user, and corresponds to the workload, the performance requirements, and the operational policy.

In FIG. 1, (b) is a parameter that can be set by an operator, and corresponds to the operational policy.

In FIG. 1, (c) is a parameter that can be extracted from the monitoring data, and corresponds to the workload and the operational policy.

The VM implementation/scaling control unit 13 implements or scales a VM on the basis of the amount of resources required to be allocated to the VM according to the output of the resource amount calculation unit 12, and cooperates with other operation support systems to provide services.

The monitoring/data collection unit 14 collects monitoring data for the VM implemented or scaled by the VM implementation/scaling control unit 13, or monitoring data related to a physical machine accommodating VMs.

Specifically, the monitoring/data collection unit 14 can collect monitoring data including the following (1) to (5) and the like.

(1) Log data for the performance of the VM implemented or scaled by the VM implementation/scaling control unit 13

(2) Log data for the workload of the VM implemented or scaled by the VM implementation/scaling control unit 13

(3) Log data for the resource operational status of the VM implemented or scaled by the VM implementation/scaling control unit 13

(4) Log data for the environmental conditions regarding a physical machine accommodating the VM implemented or scaled by the VM implementation scaling control unit 13

(5) Log data for the resource amount of the VM implemented or scaled by the VM implementation/scaling control unit 13

The monitoring/data collection unit 14 can use this monitoring data as the past monitoring data for continued learning (updating) of the fitting/learning model.

Steps for implementing the function of the VM implementation/scaling control unit 13 include the following (1) and (2).

(1) A VM is implemented by writing the required resource amount to YAML (yaml ain't markup language) and then passing to HEAT.

(2) A VM is implemented by writing the required resource amount to TOSCA (Topology and Orchestration Specification for Cloud Applications) and then passing to Tacker.

The monitoring/data collection unit 14 may be implemented through monitoring and collection using openstack (registered trademark) ceilometer, top, dstat, sar, httpry, and the like. YAML, HEAT, TOSCA, Tacker, and openstack ceilometer are disclosed in the following websites:

YAML: http://yaml.org/
HEAT: https://wiki.openstack.org/wiki/Heat
TOSCA: http://docs.oasis-open.org/tosca/tosca-nfv/v1.0/tosca-nfv-v1.0.html
Tacker: https://wiki.openstack.org/wiki/Tacker
openstack ceilometer: https://docs.openstack.org/ceilometer/queens/

Figure 2:
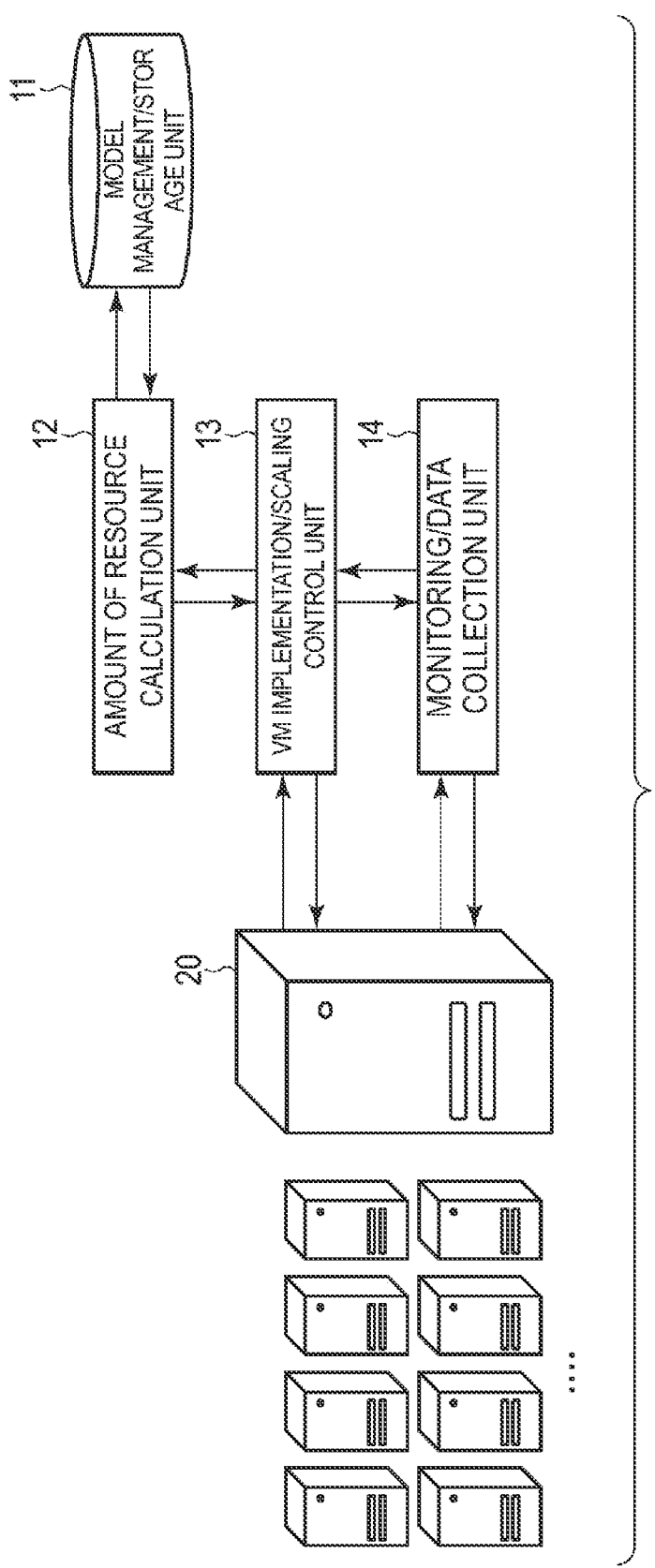
FIG. 2 is a diagram illustrating an example of an implementation scheme for the resource determination device according to one embodiment of the present disclosure.

Next, an example of how the resource determination device 10 is implemented as a system will be described. FIG. 2 is a diagram illustrating an example of an implementation scheme for the resource determination device according to one embodiment of the present disclosure.

The scheme illustrated in FIG. 2 includes a scheme of implementing the functional units (such as the model management/storage unit 11, the resource amount calculation unit 12, the VM implementation/scaling control unit 13, and the model monitoring/data collection unit 14) in a single computing machine, and a scheme of implementing the functional units individually in separate computing machines.

Communications among the plurality of functional units can be performed using a communication protocol such as http.

A group of physical servers (hosts) 20 providing cloud resources are provided with a monitoring client and a VM implementation client implemented in each of the servers.

Communications between the monitoring client and the monitoring/data collection unit 14 and between the VM implementation client and the VM implementation/scaling control unit 13 can be performed using a communication protocol such as http.

As described above, the resource determination device 10 according to the present disclosure can determine the amount of resources to be allocated to the VM, while considering each of the workload, the performance requirements, the operational policy, and the environmental conditions.

The service can be operated in accordance with the operational policy with the performance requirements being satisfied.

Furthermore, the resource determination device 10 can calculate the appropriate amount of resources in real time with respect to (1) addition of a new performance requirement or a change in the performance requirements, and (2) a change in the workload, the environmental conditions, and the operational policy.

The impact of the environmental conditions on the VM performance will now be described.

Figure 3:
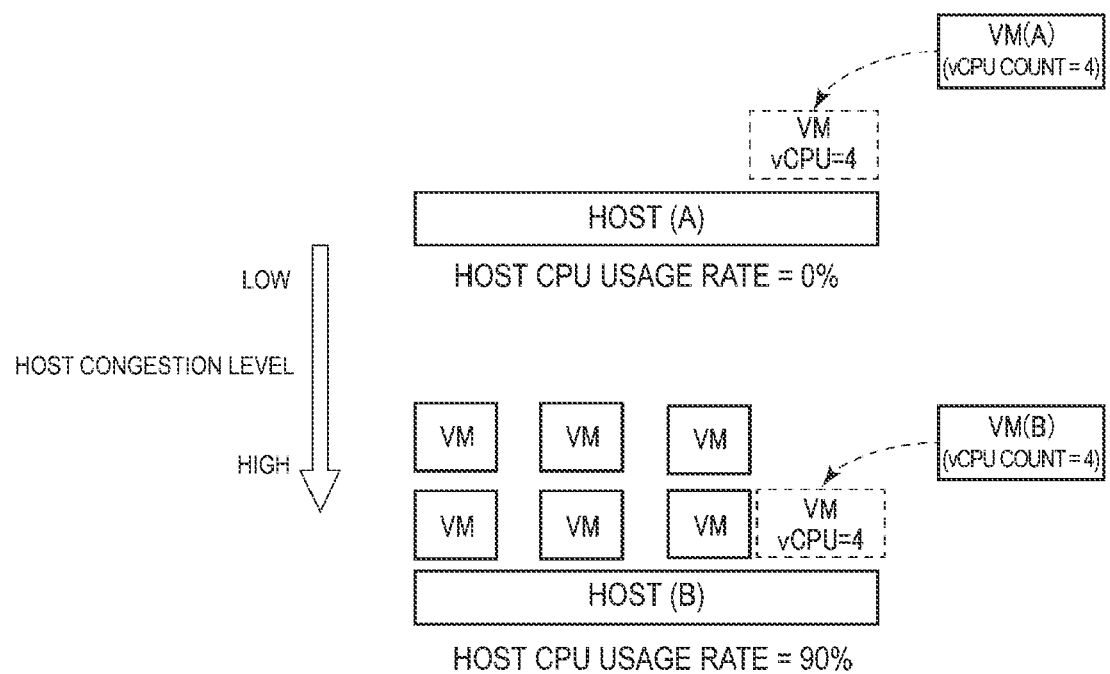
FIG. 3 is a diagram illustrating an example of the impact of environmental conditions input by the resource determination device according to one embodiment of the present disclosure.

FIG. 3 is a diagram illustrating an example of the impact of environmental conditions input by the resource determination device according to one embodiment of the present disclosure.

Examples of the environmental conditions include host congestion level (that is, host resource usage rate).

A change in the host congestion level may result in a change in a performance index such as VM processing performance. Thus, the amount of resources allocated to the VM needs to be determined and adjusted while taking the host congestion level into account, so that the performance requirements can be kept satisfied.

Next, the necessity to take the host congestion level into account for determining the amount of resources allocated to the VM will be described.

To begin with, there is a high likelihood that (1) and (2) are not equal: (1) a performance of the VM (A) in which the vCPU count allocated to a host with a low congestion level being 4 (four) might (in the example illustrated in FIG. 3, a host (A) with the host CPU (CPU provided to the host) usage rate being 0[%]); (2) a performance of the VM (B) in which the vCPU count allocated to a host with a high congestion level being 4 (four) (in the example illustrated in FIG. 3, a host (B) with the host CPU usage rate being 90[%]).

Thus, a larger amount of resources needs to be allocated to the VM(B) than those allocated to the VM(A) in such a way that the identical performance requirements are satisfied.

When the host congestion level is extremely high, the performance requirements might fail to be satisfied, even if the amount of resources allocated to VMs accommodated in the host is increased. In this case, the VMs might need to be reallocated to another host.

Figure 4:
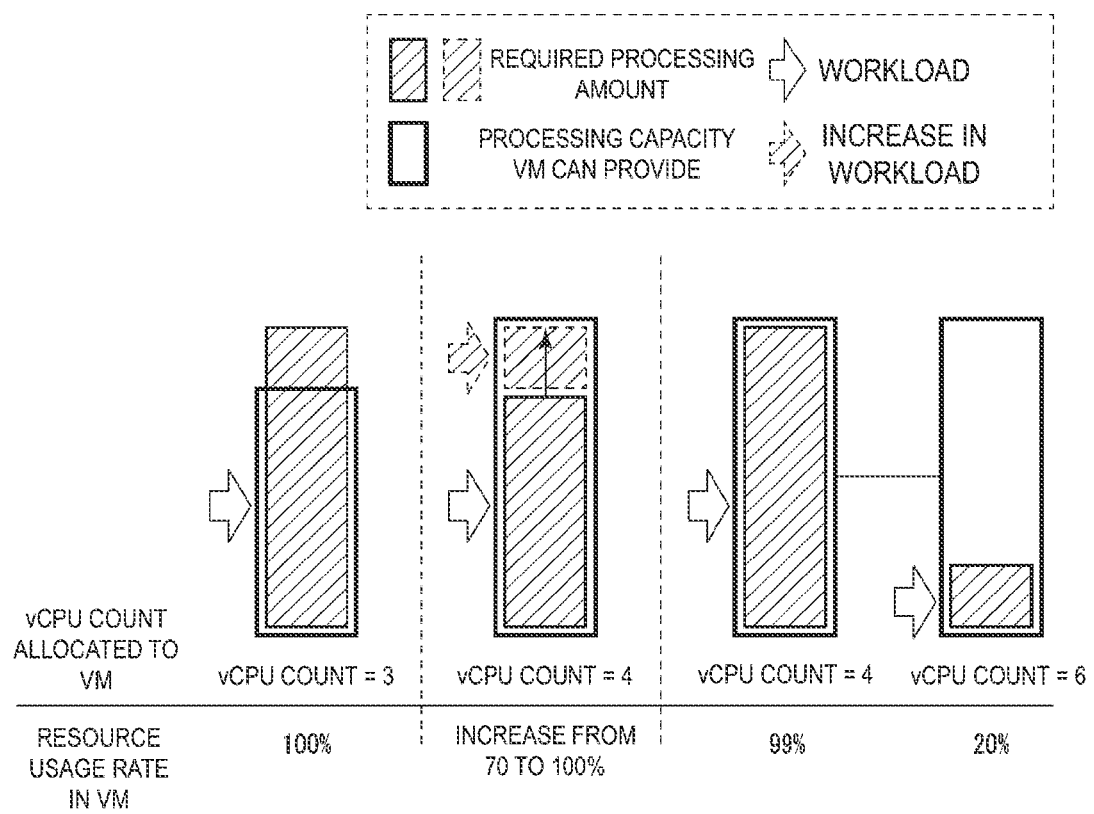
FIG. 4 is a diagram illustrating an example of a problem that is likely to occur during the operation, without a limitation on an operational policy input by the resource determination device according to one embodiment of the present disclosure.

Next, the necessity to take the operational policy into account for determining the amount of resources allocated to the VM will be described. FIG. 4 is a diagram illustrating an example of a problem that is likely to occur during the operation, without a limitation on the operational policy input by the resource determination device according to one embodiment of the present disclosure.

Examples of the operational policy include a limitation on the resource usage rate in the VM. The limitation may be imposed on the resource usage rate in the VM of the cloud provider, to achieve distinctive service, improved operational stability, efficient resource usage, and the like. FIG. 4 indicates a lack of limitation on the resource usage rate may lead to failure to satisfy the performance requirements, occurrence of bottleneck, and compromised resource usage efficiency.

To keep the resource usage rate in the VM within a limited range, the amount of resources allocated to the VM needs to be determined/adjusted on the basis of the workload.

In the first example illustrated in FIG. 4, the resource usage rate in the VM (the vCPU count=3) is already 100%. Thus, the processing performance that can be provided by the VM cannot satisfy the workload processing amount requirement (required processing amount).

In the second example illustrated in FIG. 4, the resource usage rate in the VM (the vCPU count=4) is increased from 70[%] to 100[%] due to an increase in the workload and the like. This results in a higher risk of violation of Service Level Agreement (SLA).

In the third example illustrated in FIG. 4, the resources usage rates of the first VM (the vCPU count=4) and the second VM (the vCPU count=6) among a plurality of VMs for providing a service are respectively 99[%] and 20[%]. Thus, the first VM with a high resource usage rate involves a higher risk of bottleneck.

Furthermore, excessive allocation of resources to the second VM cannot be prevented, and thus, the resource usage efficiency of the second VM might be compromised.

In view of the above, with the resource usage rate in the VM maintained within an appropriate range (e.g., 50 to 70[%]) the following effects can be obtained: (1) satisfaction of the performance requirements; (2) prevention of bottleneck; (3) efficient allocation of resources in accordance with an increase/reduction in the workload, and the like.

To maintain the resource usage rate in the VM within an appropriate range for a performance requirement in question, the resource amount needs to be determined as appropriate.

Next, an example of the monitoring data will be described. FIG. 5 is a diagram illustrating, in a table format, an example of monitoring data output by the resource determination device according to one embodiment of the present disclosure.

In the example illustrated in FIG. 5, the monitoring data may include (1) timestamp (year/month/day), (2) sent requests per second, (3) received responses per second, (4) average process time [ms], (5) the vCPU count allocated to the VM; (6) the amount of memory [GB] allocated to the VM, (7) the storage size [GB] allocated to the VM, (8) a CPU usage rate [%] in the VM, (9) a memory usage rate [%] in the YM, (10) a host CPU usage rate [%], and (11) a host memory (memory allocated to the host) usage rate [%].

The monitoring data may further include i/o throughput, storage usage rate, paging ratio, and the like.

The timestamp indicates that past monitoring data is collected once in every minute. The sent requests per second correspond to the log data related to the amount of the workload. The received responses per second and the average process time correspond to the log data related to the performance. The received responses per second indicate the amount of the workload actually processed under the corresponding environmental condition and the operational policy.

The vCPU count allocated to the VM, the amount of the memory allocated to the VM, and the storage size allocated to the VM correspond to the log data related to the amount of resources allocated to the VM.

The CPU usage rate in the VM and the memory usage rate in the VM correspond to the operational status of the resources of the VM.

The host CPU usage rate and the host memory usage rate correspond to the environmental conditions.

Next, details regarding the implementation of the resource determination device 10 will be described.

There are a plurality of ways of implementing a model configuration, a model fitting/learning method, and a resource amount calculation method. Here, the following two examples are described.

(1) Mathematical model-fitting method
(2) Neural network model learning method

The model and the fitting method of the mathematical model-fitting method are as follows.

Model: mathematical function
Fitting method: Fitting (approximating) a selected function.

Examples of the mathematical function include a linear model, a polynomial model, and a combination thereof.

The model and the learning method of the neural network model are as follows.

Model: neural network model

Learning method: The neural network is trained using the past monitoring data as the training data.

Next, an example is described where models are generated using the two types of methods described above, and with the models, the vCPU count (one type of resource amounts) allocated to the VM is calculated on the basis of (1) the workload, (2) the workload processing performance requirement (one type of performance requirements), (3) the host congestion level (one type of environmental conditions), and (4) the limitation on the resource usage rate in the VM (one type of operational policies).

Figure 6:
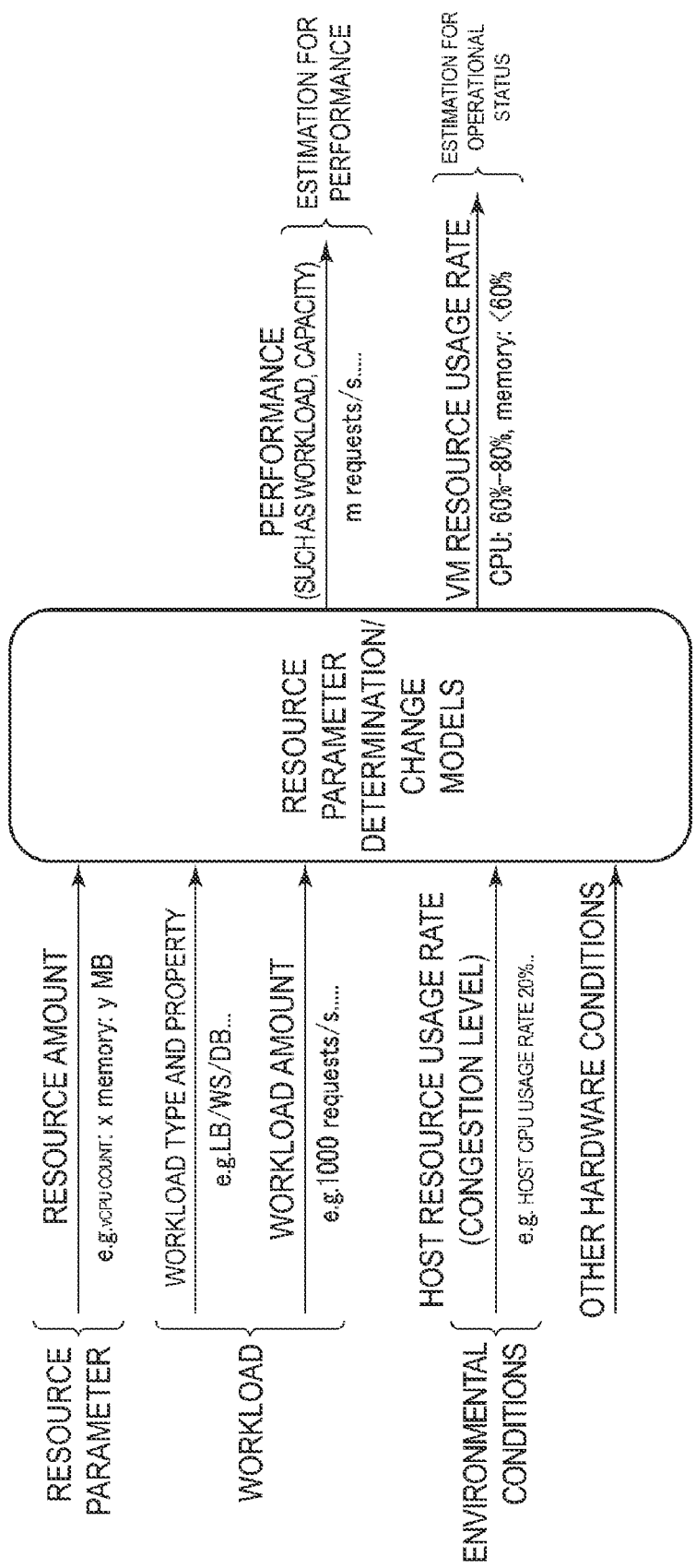
FIG. 6 is a diagram illustrating an example of a model applied to the resource determination device according to one embodiment of the present disclosure.

Next, a model configuration will be described. FIG. 6 is a diagram illustrating an example of a model applied to the resource determination device according to one embodiment of the present disclosure.

A resource parameter determination/changing model corresponding to the fitting/learning model receives a resource parameter, a workload, and an environmental condition, and outputs an estimation result of the performance and an estimation result of the resource operational status of the VM.

The resource parameter includes a resource amount (e.g., vCPU count: x, memory: y [MB]).

The workload includes the workload type/property (e.g., Load Balancer (LB)/WS/DB . . . ) and the workload amount (e.g., 1000 [requests/s] . . . ).

The environmental condition includes Host resource usage rate (congestion level) (e.g., host CPU usage rate 20[%] . . . ), and other hardware conditions.

The estimated result of the performance includes performance (such as workload and accommodation amount) (e.g., m [requests/s] . . . ).

The estimated result of the resource operational status of the VM includes VM resource usage rate (e.g., CPU: 60 to 80[%], memory: <60[%]).

Next, an example of a mathematical model-fitting method will be described. FIG. 6 is a diagram illustrating an example of a mathematical model-fitting method applied to the resource determination device according to one embodiment of the present disclosure.

The initial model of the mathematical model-fitting method is configured using two polynomial models f1 and f2. The observational analysis results for past monitoring data serve as the selection criterion for the polynomial models. Mathematical model configurations other than the polynomial models may be employed.

The model f1 is a model for estimating performance, and is used for obtaining the VM maximum workload processing performance.

The VM maximum workload processing performance is expressed by the following Formula (1).

VM maximum workload processing performance=f1
(vCPU count, host congestion level)　　Formula (1)

The VM maximum workload processing performance may be extracted for the corresponding vCPU count and host congestion level, from the past monitoring data.

The model f2 is a model for estimating the resource operational status of the VM, and is used for obtaining a resource usage rate in the VM.

The resource usage rate in the VM is expressed by the following formula (2).

Resource usage rate in VM=f2 (vCPU count, workload)　　Formula (2).

This indicates that, in the observational analysis on the past monitoring data, the resource usage rate in the VM is affected by the vCPU count and the workload while it is not affected by the host congestion level.

The learner performs fitting of the past monitoring data to the initial model to determine the functions f1 and f2 of the initial model. Thus, the fitting model is generated.

Figure 7:
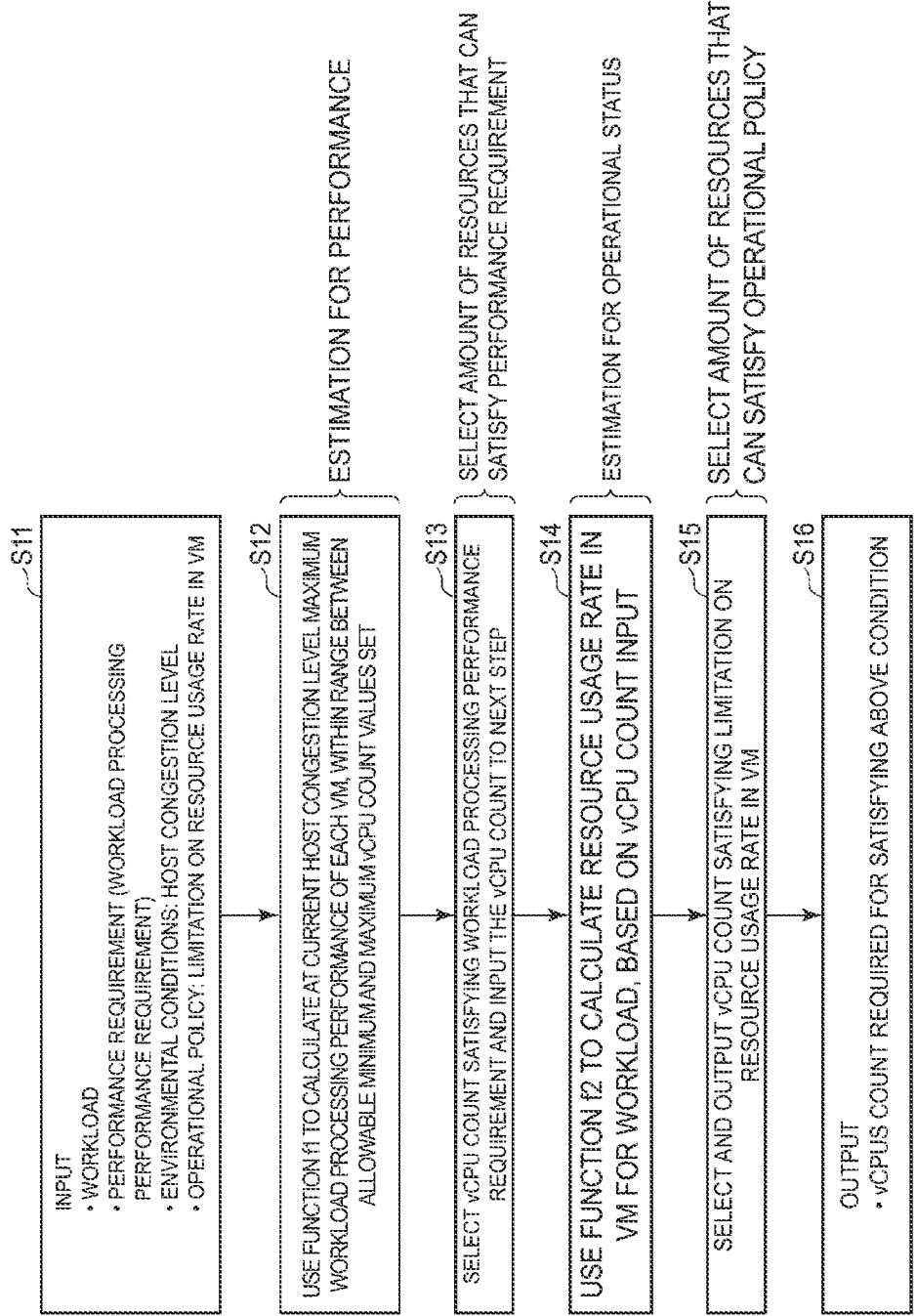
FIG. 7 is a diagram illustrating an example of a logic of a resource amount calculation unit of the resource determination device according to one embodiment of the present disclosure.

Next, a logic of the resource amount calculation unit in the case where the model in the mathematical model-fitting method is used will be described. FIG. 7 is a diagram illustrating an example of the logic of the resource amount calculation unit of the resource determination device according to one embodiment of the present disclosure.

First of all, each of (1) to (4) is input to the resource amount calculation unit 12 (S11): (1) log data on the workload, (2) the performance requirement (workload processing performance requirement), (3) log data on the environmental condition (host congestion level), and (4) the operational policy (limitation on the resource usage rate in the VM).

The resource amount calculation unit 12 uses the input results in S11 and the function f1 of the model in the mathematical model-fitting method, to calculate the performance (VM maximum workload processing performance) under a condition where the vCPU count is within a range between allowable minimum and maximum values set, with the host congestion level input at the current time point (S12). The calculation result corresponds to the estimation result of the performance.

The resource amount calculation unit 12 compares the performance calculated in S12 (the VM maximum workload processing performance) with a performance requirement (workload processing performance requirement) set by the cloud user, to select the resource amount (vCPU count) that can satisfy the performance requirement (S13).

This selection result corresponds to a selection result of the resource amount that can satisfy the performance requirement. The type of the vCPU count selected in this process may be a single type (for example, four) or may be a plurality of types (for example, four or five).

The resource amount calculation unit 12 uses the input results in S11 and the function f2 of the model in the mathematical model-fitting method to calculate the resource usage rate in the VM for the vCPU count selected in S13 with the workload input in S11 (S14). This calculation result corresponds to the estimation result of the resource operational status of the VM.

The resource amount calculation unit 12 selects the vCPU count required for satisfying the limitation on the resource usage rate in the VM input in S11 (S15). This selection result corresponds to a result of selecting the resource amount satisfying the operational policy. The resource amount calculation unit 12 outputs the vCPU count that is the selection result in S15, to the VM implementation/scaling control unit 13 as the amount of resources allocated to the VM satisfying the workload processing performance requirement and the operational policy (S16).

Next, an example of the above-described neural network model learning method will be described.

The initial model in the neural network model learning method includes two neural network models (model A and model B).

The model A is a model for estimating the performance of a VM, and is used for calculating a workload amount that can be processed, relative to the workload processing amount, under the condition of the corresponding host congestion level and the resource usage rate in the VM.

Figure 8:
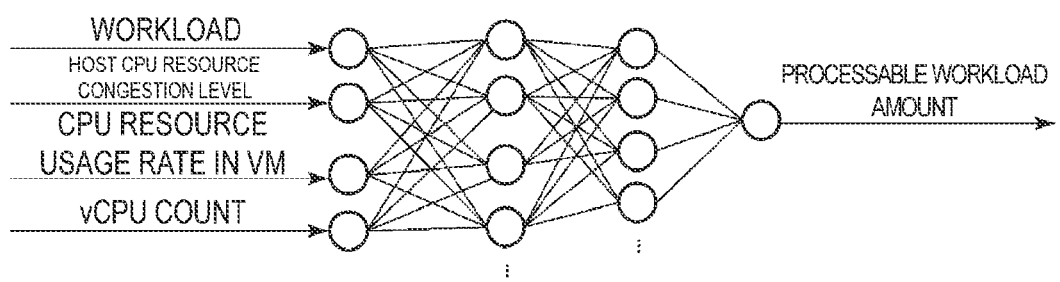
FIG. 8 is a diagram illustrating an example of a first model in a neural network model learning method applied to the resource determination device according to one embodiment of the present disclosure.

FIG. 8 is a diagram illustrating an example of a first model in the neural network model learning method applied to the resource determination device according to one embodiment of the present disclosure.

As illustrated in FIG. 8, the model A receives the workload, the host CPU resource congestion level, the CPU resource usage rate in the VM, and the vCPU count, and outputs the workload processing amount that can be processed by the VM.

The model B is a model for estimating the resource operational status of the VM, and is used for calculating the resource usage rate in the VM for the required workload requirements and the corresponding host congestion level.

Figure 9:
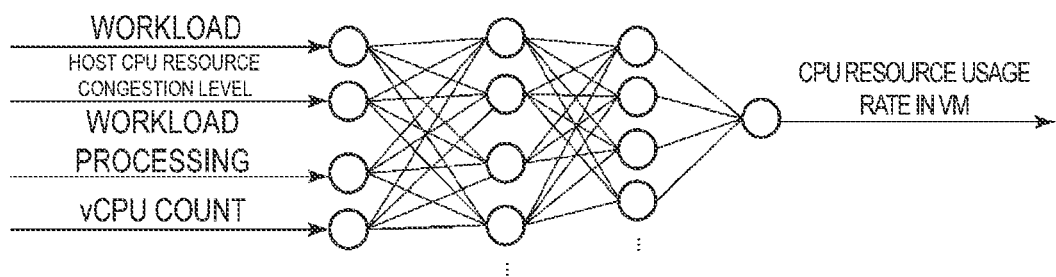
FIG. 9 is a diagram illustrating an example of a second model in the neural network model learning method applied to the resource determination device according to one embodiment of the present disclosure.

FIG. 9 is a diagram illustrating an example of a second model in the neural network model learning method applied to the resource determination device according to one embodiment of the present disclosure.

As illustrated in FIG. 9, the model B receives the workload, the host CPU resource congestion level, the workload processing amount, and the vCPU count, and outputs the CPU resource usage rate in the VM.

The cloud user inputs a part of the past monitoring data, as training data, into the initial model to train the neural network. Accordingly, the learning model is generated. The resource determination device 10 also evaluates the accuracy of the learning model using a part of the past monitoring data.

Types of the neural network model other than those illustrated in FIGS. 8 and 9 may be employed.

Figure 10:
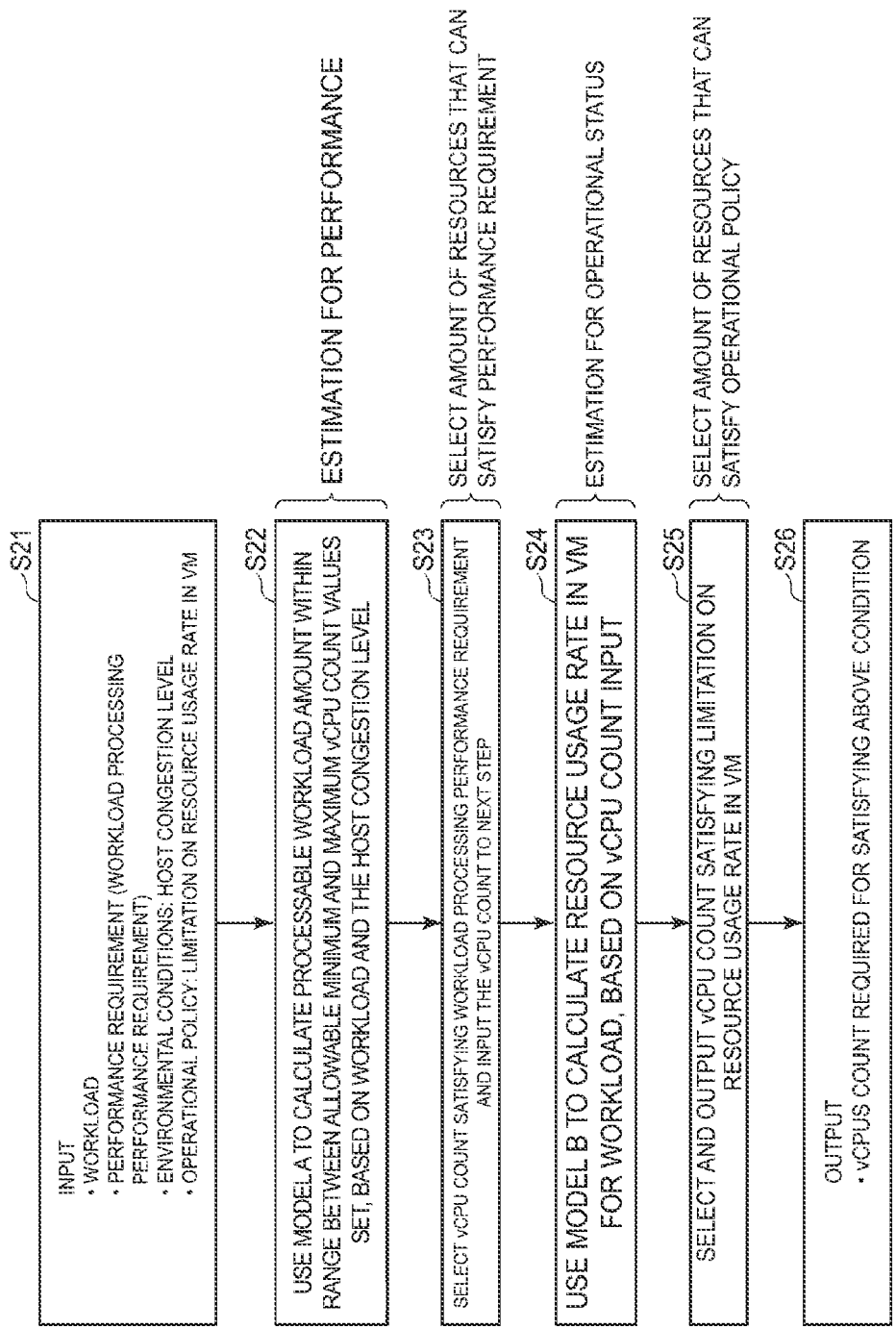
FIG. 10 is a diagram illustrating an example of the logic of the resource amount calculation unit of the resource determination device according to one embodiment of the present disclosure.

Next, a logic of the resource amount calculation unit in the case where the model in the neural network is used will be described. FIG. 10 is a diagram illustrating an example of the logic of the resource amount calculation unit of the resource determination device according to one embodiment of the present disclosure. First of all, each of (1) log data on the workload, (2) the performance requirement (workload processing performance requirement), (3) log data on the environmental condition (host congestion level), and (4) the operational policy (limitation on the resource usage rate in the VM) is input to the resource amount calculation unit 12 (S21).

The resource amount calculation unit 12 uses the input results in S21 and the model of the neural network, to calculate the performance (VM maximum workload processing performance) under a condition where the vCPU count is within a range between allowable minimum and maximum values, with the current workload and host congestion level (S22). The calculation result corresponds to the estimation result of the performance.

The resource amount calculation unit 12 compares the performance calculated in S22 (the amount of workload processable by the VM) with a performance requirement (requirement for the amount of workload processable by the VM) set by the cloud user, to select the resource amount (vCPU count) that can satisfy the performance requirement (S23). This selection result corresponds to a selection result of the resource amount that can satisfy the performance requirement.

The resource amount calculation unit 12 uses the input results in S21 and the model B of the neural network to calculate the resource usage rate in the VM for the vCPU count input in S21 with the workload and the host congestion level input in S21 (S24). This calculation result corresponds to the estimation result of the resource operational status of the VM.

The resource amount calculation unit 12 selects the vCPU count required for satisfying the limitation on the resource usage rate in the VM input in S21 (S25). This selection result corresponds to a result of selecting the resource amount satisfying the operational policy.

The resource amount calculation unit 12 outputs the vCPU count that is the selection result in S25, to the VM implementation/scaling control unit 13 as the amount of resources allocated to the VM satisfying the workload processing performance requirement and the operational policy (S26).

Figure 11:
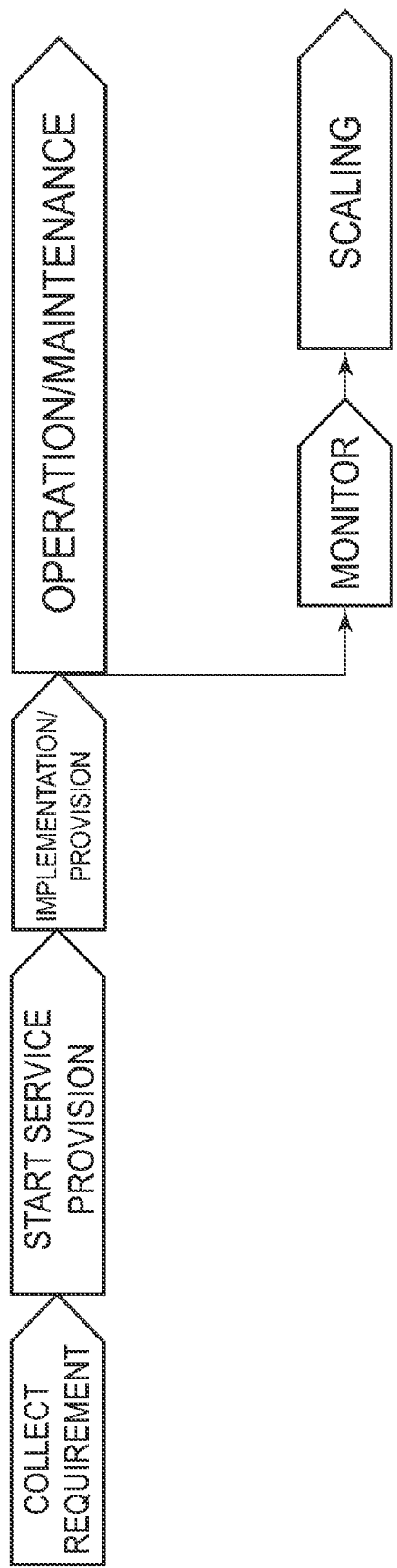
FIG. 11 is a diagram illustrating an example of service provision start/scaling assist by the resource determination device according to one embodiment of the present disclosure.

Next, an example where service provision start/scaling is assisted using the resource determination device 10 will be described. FIG. 11 is a diagram illustrating an example of service provision start/scaling assist by the resource determination device according to one embodiment of the present disclosure.

(1) When the service starts to be provided, the resource amount calculation unit 12 of the resource determination device 10 calculates the amount of resources allocated to the VM in accordance with the workload, performance requirement, environmental condition, and operational policy.

(2) After the service starts to be provided, along with service operation maintenance, the resource amount calculation unit 12 acquires the results of monitoring the workload, performance requirement, environmental condition, and operational policy, and adjusts the amount of resources allocated to the VM based on a change in the result of the monitoring (scaling).

Figure 12:
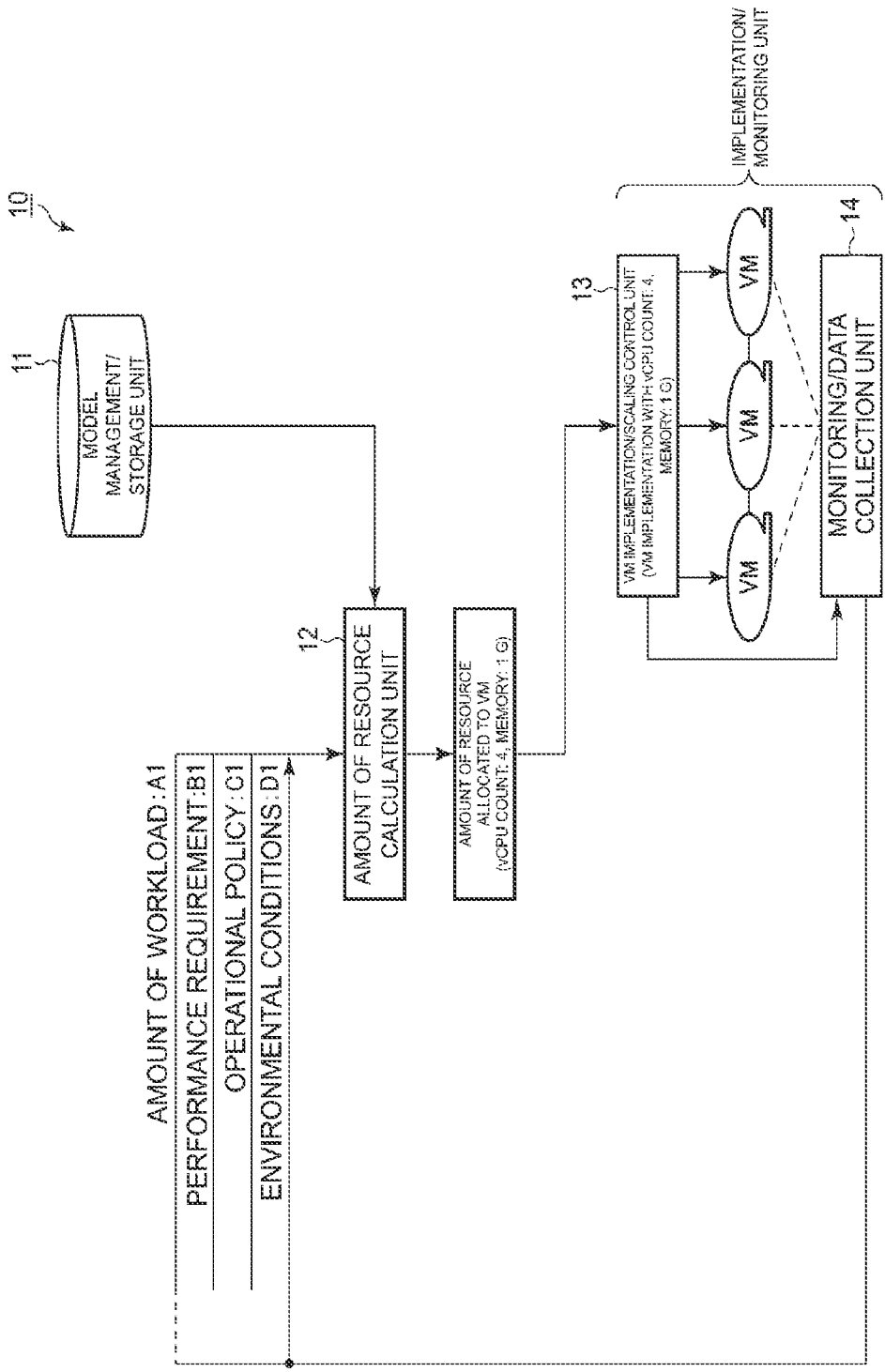
FIG. 12 is a diagram illustrating a specific example of calculation of the amount of resources allocated to a VM when a service starts to be provided, performed by the resource determination device according to one embodiment of the present disclosure.

Next, a specific example of calculation of the amount of resources allocated to the VM when the service starts to be provided will be described. FIG. 12 is a diagram illustrating a specific example of calculation of the amount of resources allocated to a VM when a service starts to be provided, performed by the resource determination device according to one embodiment of the present disclosure.

Here, the neural network is used as the initial model.

In the example illustrated in FIG. 12, when the cloud service starts to be provided, the resource amount calculation unit 12 of the resource determination device 10 calculates a required amount of each of the resources (vCPU count and memory amount) allocated to the VM, on the basis of (1) workload, (2) host congestion level (one type of environmental condition), and (3) limitation on the resource usage rate in the VM (one type of the operational policy), to satisfy the performance requirement.

The required amount of resources is the amount of resources satisfying each of the performance requirement and the operational policy.

A neural network model is used for the initial model. Construction and training of the neural network model can be implemented using existing machine learning libraries an example of which including tensorflow (registered trademark) (see, e.g., https://www.tensorflow.org/). Here, a learning model is generated and stored in the model management/storage unit 11, with the past monitoring data of the service provided in the past input to the learner.

Here, the workload of a new service (under conditions of type: web server and feature value: web page size=10 [kb]), the limitation on the resource usage rate in the VM, the congestion level of the CPU resources of the host to which the VM is to be allocated, and the congestion level of the memory resources of the host that are input to the resource amount calculation unit 12 are respectively 10000 [requests per second] (A1 in FIG. 12), 50 to 70[%] (C1 in FIG. 12), 10[%], and 40[%] (D1 in FIG. 12).

Each of (1) workload, (2) limitation on the resource usage rate in the VM, (3) the congestion level of the CPU resources of the host to which the VM is to be allocated, and (4) the congestion level of the memory resources of the host is input to the resource amount calculation unit 12. The resource amount calculation unit 12 calculates the amount of resources (vCPU count: 4, memory volume: 1 [GB]) allocated to the VM, satisfying the performance requirement (97% or more of the requests is processed (B1 in FIG. 12)).

The VM implementation/scaling control unit 13 implements a VM with the vCPU count of 4 and the memory amount of 1 [GB], and cooperates with other operation support system to provide services.

The monitoring/data collection unit 14 collects the monitoring data by monitoring (1) the workload of the service, (2) performance, (3) the resource usage rate in the VM accommodating the service, (4) the host congestion level, (5) the resource amount, and the like. The monitoring/data collection unit 14 feeds back the collected host congestion level to the resource amount calculation unit 12, to update the host congestion level, which is input to the resource amount calculation unit 12, in real-time.

The monitoring/data collection unit 14 can update the model by periodically passing the monitoring data to the learner as past monitoring data to make the learner relearn the data.

Figure 13:
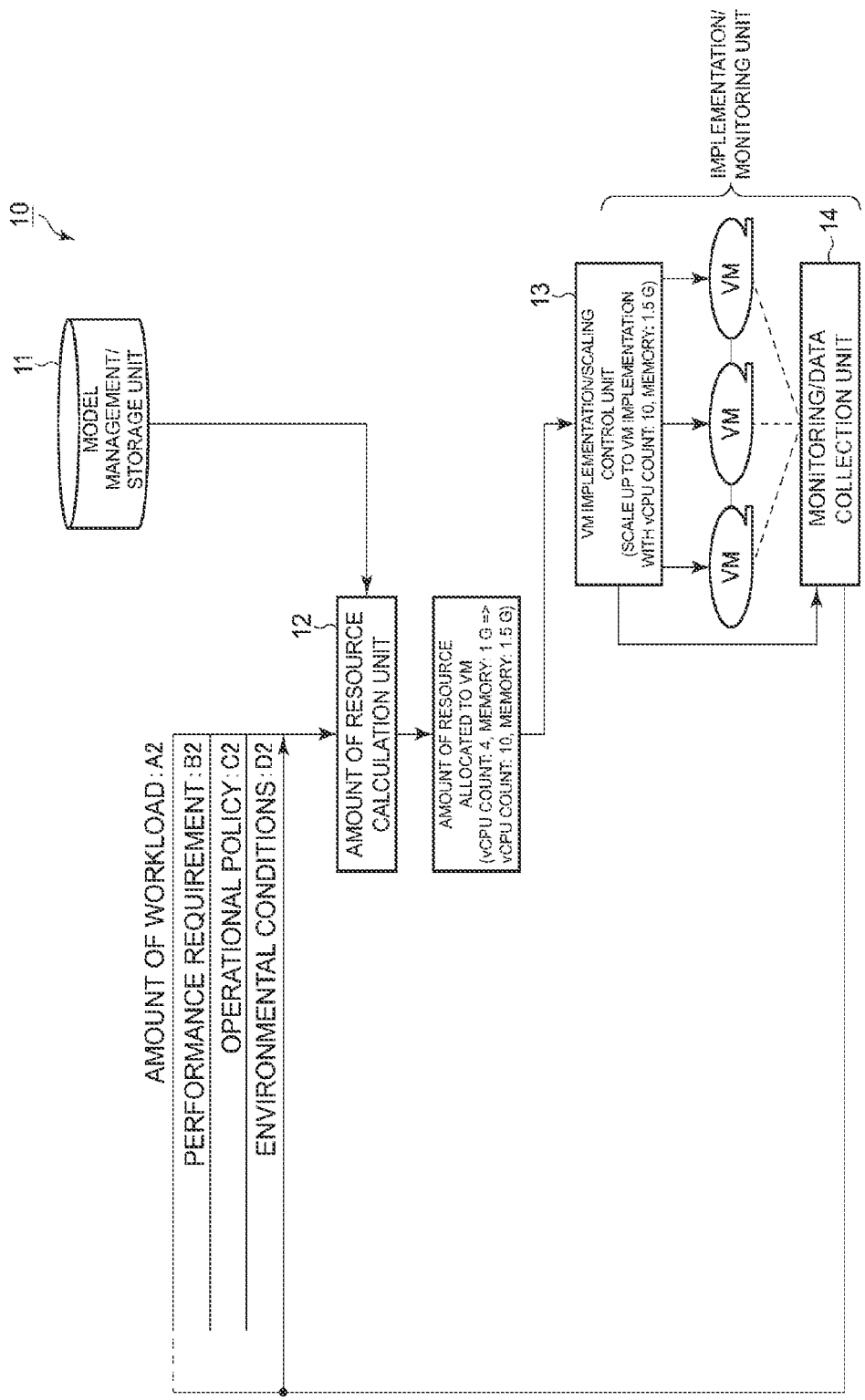
FIG. 13 is a diagram illustrating a specific example of adjustment of the amount of resources allocated to a VM after the service has started to be provided, performed by the resource determination device according to one embodiment of the present disclosure.

Next, a specific example of adjustment of the amount of resources allocated to the VM after the service has started to be provided will be described. FIG. 13 is a diagram illustrating a specific example of adjustment of the amount of resources allocated to a VM after the service has started to be provided, performed by the resource determination device according to one embodiment of the present disclosure.

Here, the neural network is used as the initial model.

In the example illustrated in FIG. 13, in the cloud service under operation, the resource amount calculation unit 12 of the resource determination device 10 adjusts the resource amount of the VM (vCPU count, memory amount) based on a change in at least one of the performance requirement, the workload, the host congestion level (one type of environmental condition), or the limitation on the resource usage rate in the VM (one type of operational policy), so that the performance requirement can be kept satisfied.

In an example described herein, the performance requirement is assumed to be unchanged. Still, the amount of resources allocated to the VM may be adjusted based on a change in the performance requirement so that the requirement can be kept satisfied.

Here, a learning model is generated and stored in the model management/storage unit 11, with the past monitoring data input to the learner.

It is assumed herein that the workload amount of the service has changed from 10000 [requests per second] to 20000 [requests per second] (A2 in FIG. 13), the limitation on the resource usage rate in the VM has changed from 50 to 70[%] to 60 to 80[%] (C2 in FIG. 13), the congestion of the CPU resources of the host accommodating the VM has changed from 10[%] to 30[%], and the congestion level of the memory resources of the host has changed from 40[%] to 50[%] (D2 in FIG. 13).

The resource amount calculation unit 12 receives the information as a result of changes as described above, and calculates an appropriate resource amount (vCPU count: 10, memory: 1.5 [GB]) so that the performance requirement (processing 97[%] of the requests or more (B2 in FIG. 13)) from the start of the provision of the service can be kept satisfied.

Based on the calculation result obtained by the resource amount calculation unit 12, the VM implementation/scaling control unit 13 scales up the vCPU count allocated to the VM from 4 to 10, and scales up the memory amount allocated from 1 [GB] to 1.5 [GB].

The monitoring/data collection unit 14 collects the data by monitoring (1) the workload of the service provided, (2) performance, (3) the resource usage rate in the VM accommodating the service, (4) the host CPU and memory congestion level, and (5) the resource amount of the host CPU and memory.

The host congestion level input by the resource amount calculation unit 12 is updated in real time based on the host congestion level collected by the monitoring/data collection unit 14. The learning model is updated with the host congestion level being passed to the learner and the past monitoring data being relearned.

Figure 14:
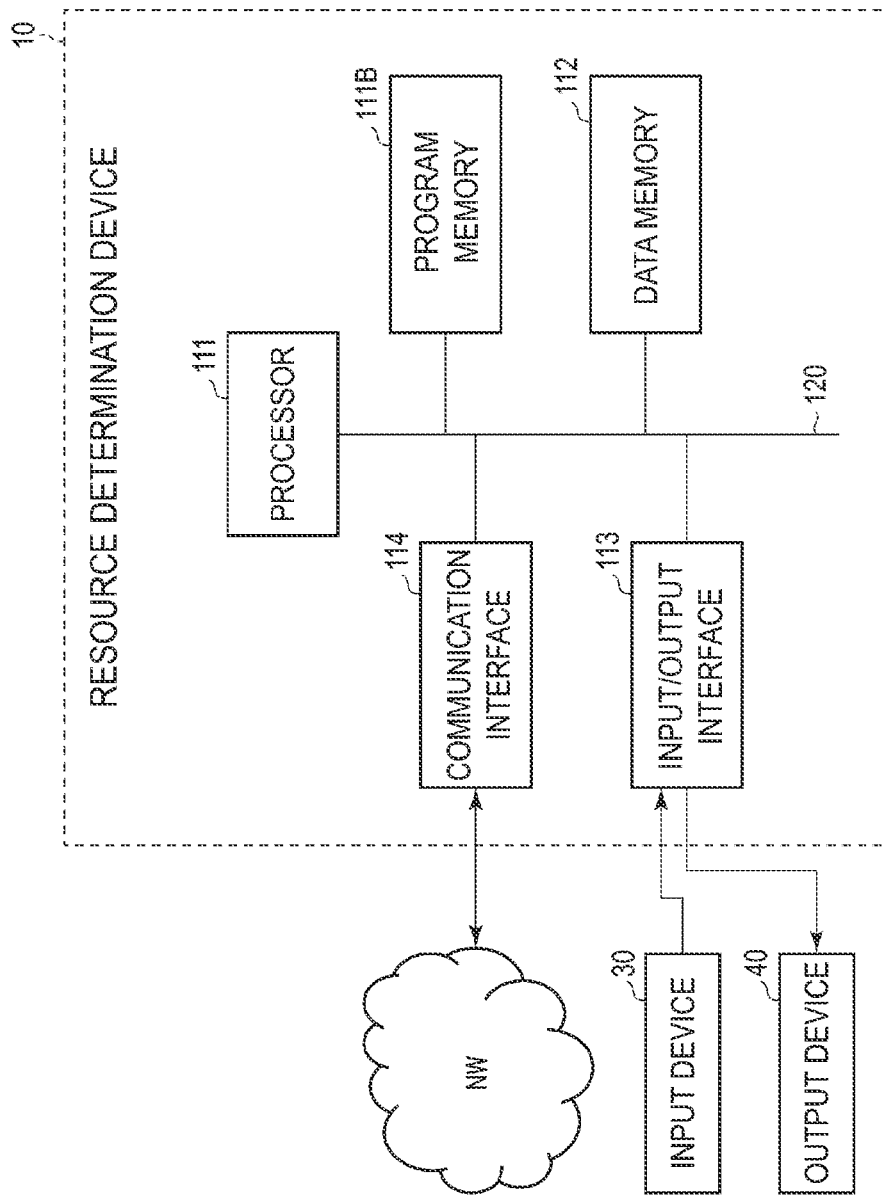
FIG. 14 is a block diagram illustrating an example of a hardware configuration of the resource determination device according to one embodiment of the present disclosure.

FIG. 14 is a block diagram illustrating an example of a hardware configuration of the resource determination device according to one embodiment of the present disclosure.

In the example illustrated in FIG. 14, the resource determination device 10 according to the above-described embodiment is configured by a server computer or a personal computer, for example, and includes a hardware processor 111A such as a CPU. A program memory 111B, a data memory 112, an input/output interface 113, and a communication interface 114 are connected to the hardware processor 111A through a bus 120.

The communication interface 114 includes, for example, one or more wireless communication interface units, enabling information to be transmitted to and received from a communication network NW. As the wireless interface, for example, an interface adopting a small-power wireless data communication standard, such as a wireless local area network (LAN), is used.

The input/output interface 113 is connected with an input device 30 for an operator and an output device 40 provided to the resource determination device 10.

The input/output interface 113 receives operation data input by an administrator through the input device 30, such as a keyboard, a touch panel, a touch pad, or a mouse, and performs processing for outputting output data to the output device 40 including a display device employing liquid crystals, organic electroluminescence (EL), or the like to display the output data. Note that the input device 30 and the output device 40 may be devices included in the resource determination device 10, or may be an input device and an output device for another information terminal capable of communicating via the network NW.

The program memory 111B is configured by combining, as a non-transitory tangible storage medium, a non-volatile memory in which writing and reading can be performed any time, such as a hard disk drive (HDD) or a solid state drive (SSD), and a non-volatile memory such as a read only memory (ROM), for example, and stores programs required for performing various types of control processing according to one embodiment.

The data memory 112 is configured by combining, as a tangible storage medium, the non-volatile memories described above and a volatile memory such as a random access memory (RAM), for example, and is used to store various types of data acquired and generated in the course of performing information collection processing.

The resource determination device 10 according to one embodiment of the present disclosure may be configured as a processing functional unit by software and serve as a data processing device including the model management/storage unit 11, the resource amount calculation unit 12, the VM implementation/scaling control unit 13, and the monitoring/data collection unit 14 illustrated in FIG. 1.

The model management/storage unit 11 may be configured with the data memory 112 illustrated in FIG. 14. However, the model management/storage unit 11 is not an essential configuration in the resource determination device 10, and may be provided in an external storage medium, such as a universal serial bus (USB) memory or a storage device, such as a database server in a cloud.

All of the processing functional units of the resource amount calculation unit 12, the VM implementation/scaling control unit 13, and the monitoring/data collection unit 14 described above are implemented with the hardware processor 111A reading and executing programs stored in the program memory 111B. Some or all of these processing functional units may be implemented in various forms including integrated circuits such as an application specific integrated circuit (ASIC) and a field-programmable gate array (FPGA).

As described above, the resource determination device according to one embodiment of the present disclosure can determine a resource amount required for a virtual machine as appropriate, and reduce the personnel cost required for determination on the resource. Here, the resource amount allocated to the virtual machine is calculated in a was such that the requirement for the processing performance of the virtual machine and the policy of the operational status of the resource of the virtual machine are each satisfied based on the result of monitoring the resource operational status of the physical machine accommodating the virtual machine and on the processing load of the virtual machine.

Furthermore, a scheme described in each embodiment can be stored in a recording medium such as a magnetic disk (a Floppy (registered trademark) disk, a hard disk, or the like), an optical disc (a CD-ROM, a DVD, an MO, or the like), a semiconductor memory (a ROM, a RAM, a flash memory, or the like), for example, or transferred and distributed by a communication medium, as a program (a software unit) that can be executed by a computing machine (computer). The program stored in the medium also includes a setting program incorporating a software unit (including not only an execution program but also a table or data structure), which will be executed in a computing machine, into the computing machine. A calculator actualizing the present apparatus executes the above-described process by loading the program recorded on the recording medium or constructing a software unit using the setting program in some cases, and controlling an operation using the software unit. Note that the recording medium referred herein is not limited to a recording medium for distribution, but includes a storage medium such as a magnetic disk or a semiconductor memory provided in a computing machine or a device connected via a network.

It is to be noted that the present disclosure is not limited to the above embodiments and can be variously modified in the implementation stage without departing from the gist of the present disclosure. An appropriate combination of the embodiments can also be implemented, in which case a combination of their effects can be obtained. Further, the above embodiments include various inventions, which can be designed by combining constituent elements selected from a plurality of constituent elements disclosed here. For example, a configuration in which some constituent elements are removed from all the constituent elements shown in the embodiments can be designed as an invention if the problems can be solved and the effects can be achieved.

REFERENCE SIGNS LIST

10 . . . Resource determination device
11 . . . Model management/storage unit
12 . . . Resource amount calculation unit
13 . . . VM implementation/scaling control unit
14 . . . Monitoring/data collection unit

The invention claimed is:

1. A resource determination device comprising:
a storage unit configured to store a model indicating a relationship of: a processing load of a virtual machine; a processing performance of the virtual machine; a resource operational status of a physical machine accommodating the virtual machine; and a resource operational status of the virtual machine, with respect to an amount of resources allocated to the virtual machine, and
a calculation unit, including one or more processors, configured to calculate the amount of resources allocated to the virtual machine such that a requirement for the processing performance of the virtual machine and a policy of the resource operational status of the virtual machine are each satisfied based on a monitoring result of the resource operational status of the physical machine accommodating the virtual machine, the processing load of the virtual machine, and the model stored in the storage unit,
wherein the policy of the resource operational status of the virtual machine includes a limit on a resource usage rate in the virtual machine.

2. The resource determination device according to claim 1, wherein the calculation unit is configured to recalculate the amount of resources allocated to the virtual machine such that the requirement for the processing performance of the virtual machine and the policy of the resource operational status of the virtual machine are each satisfied based on a change of at least one of (i) the processing load of the virtual machine, (ii) the requirement for the processing performance of the virtual machine, (iii) the policy of the resource operational status of the virtual machine, or (iv) the monitoring result of the resource operational status of the physical machine accommodating the virtual machine.

3. The resource determination device according to claim 1 further comprising:
an implementation unit configured to implement a resource in the virtual machine based on a calculation result by the calculation unit; and
a monitoring unit configured to (i) monitor each of: a resource operational status of the physical machine accommodating the virtual machine in which the resource is implemented by the implementation unit; a resource operational status of the virtual machine in which the resource is implemented by the implementation unit; a processing load of the virtual machine in which the resource is implemented by the implementation unit; and a processing performance of the virtual machine in which the resource is implemented by the implementation unit and (ii) output a monitoring result,
wherein the model is learned based on the monitoring result from the monitoring unit, and
wherein the calculation unit is configured to calculate the amount of resources allocated to the virtual machine such that the requirement for the processing performance of the virtual machine and the policy of the resource operational status of the virtual machine are each satisfied based on the processing load of the virtual machine in which the resource is implemented by the implementation unit, the result of monitoring the resource operational status of the physical machine accommodating the virtual machine in which the resource is implemented by the implementation unit, and the model stored in the storage unit.

4. A method of resource determination performed by a resource determination device, the method comprising:

acquiring a model indicating a relationship of: a processing load of a virtual machine; a processing performance of the virtual machine; a resource operational status of a physical machine accommodating the virtual machine; and a resource operational status of the virtual machine from a storage unit, with respect to an amount of resources allocated to the virtual machine, and calculating the amount of resources allocated to the virtual machine such that a requirement for the processing performance of the virtual machine and a policy of the resource operational status of the virtual machine are each satisfied based on the acquired model, a result of monitoring the resource operational status of the physical machine accommodating the virtual machine, and the processing load of the virtual machine, wherein the policy of the resource operational status of the virtual machine includes a limit on a resource usage rate in the virtual machine.

5. A non-transitory computer readable medium having stored thereon a resource determination processing program that causes a processor to perform operations comprising:

storing a model indicating a relationship of: a processing load of a virtual machine; a processing performance of the virtual machine; a resource operational status of a physical machine accommodating the virtual machine; and a resource operational status of the virtual machine, with respect to an amount of resources allocated to the virtual machine, and calculating the amount of resources allocated to the virtual machine such that a requirement for the processing performance of the virtual machine and a policy of the resource operational status of the virtual machine are each satisfied based on a monitoring result of the resource operational status of the physical machine accommodating the virtual machine, the processing load of the virtual machine, and the stored model stored, wherein the policy of the resource operational status of the virtual machine includes a limit on a resource usage rate in the virtual machine.

6. The non-transitory computer readable medium according to claim 5, wherein the operations further comprsie recalculating the amount of resources allocated to the virtual machine such that the requirement for the processing performance of the virtual machine and the policy of the resource operational status of the virtual machine are each satisfied based on a change of at least one of (i) the processing load of the virtual machine, (ii) the requirement for the processing performance of the virtual machine, (iii) the policy of the resource operational status of the virtual machine, or (iv) the monitoring result of the resource operational status of the physical machine accommodating the virtual machine.

7. The non-transitory computer readable medium according to claim 5, wherein the operations further comprise:

implementing a resource in the virtual machine based on a calculation result;

monitoring each of: a resource operational status of the physical machine accommodating the virtual machine in which the resource is implemented; a resource operational status of the virtual machine in which the resource is implemented; a processing load of the virtual machine in which the resource is implemented; and a processing performance of the virtual machine in which the resource is implemented; and output a monitoring result, wherein the model is learned based on the monitoring result, and wherein calulating the amount of resources further comprises calculating the amount of resources allocated to the virtual machine such that the requirement for the processing performance of the virtual machine and the policy of the resource operational status of the virtual machine are each satisfied based on the processing load of the virtual machine in which the resource is implemented, the result of monitoring the resource operational status of the physical machine accommodating the virtual machine in which the resource is implemented, and the stored model.

8. The resource determination device according to claim 1, wherein the resource operational status of a physical machine indicates a CPU usage rate and a memory usage rate of the physical machine.

9. The method according to claim 4, wherein the resource operational status of a physical machine indicates a CPU usage rate and a memory usage rate of the physical machine.

10. The non-transitory computer readable medium according to claim 5, wherein the resource operational status of a physical machine indicates a CPU usage rate and a memory usage rate of the physical machine.

* * * * *